US011856138B2

(12) United States Patent
Garg et al.

(10) Patent No.: US 11,856,138 B2
(45) Date of Patent: Dec. 26, 2023

(54) PARALLEL PATH CALLER VERIFICATION CONTROLLER

(71) Applicant: T-Mobile USA, Inc., Bellevue, WA (US)

(72) Inventors: Parag Garg, Woodinville, WA (US); Homer Nicolas B. Filart, Renton, WA (US); Kathleen Foster, Kirkland, WA (US); Nicholas LaVassar, Issaquah, WA (US); George MacDonald, Newcastle, WA (US); Michele Lundahl, Yarrow Point, WA (US); Derrick Ives, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/327,427

(22) Filed: May 21, 2021

(65) Prior Publication Data

US 2022/0377172 A1    Nov. 24, 2022

(51) Int. Cl.
*H04M 3/436* (2006.01)
*H04L 65/1096* (2022.01)
*H04W 4/14* (2009.01)
*H04M 3/22* (2006.01)
*H04L 51/02* (2022.01)

(52) U.S. Cl.
CPC .......... *H04M 3/4365* (2013.01); *H04L 51/02* (2013.01); *H04L 65/1096* (2013.01); *H04M 3/2281* (2013.01); *H04W 4/14* (2013.01)

(58) Field of Classification Search
CPC ................. H04M 3/4365; H04M 3/2281

USPC ........................................................ 455/411
See application file for complete search history.

(56) References Cited

U.S. PATENT DOCUMENTS

| 6,456,706 | B1 | 9/2002 | Blood et al. |
| 7,027,569 | B2 | 4/2006 | Price |
| 8,774,379 | B1 | 7/2014 | Youngs et al. |
| 9,060,057 | B1 | 6/2015 | Danis |
| 9,277,049 | B1 * | 3/2016 | Danis ...................... H04M 3/54 |
| 10,659,602 | B1 * | 5/2020 | Cox ....................... H04W 12/06 |
| 10,764,043 | B2 * | 9/2020 | Traynor ................ H04L 9/3263 |
| 10,805,314 | B2 | 10/2020 | Jakobsson et al. |
| 2003/0152198 | A1 * | 8/2003 | Price ..................... H04M 1/663 |
| | | | 379/88.19 |

OTHER PUBLICATIONS

Reverse Phone Number Lookup search, Search for Phone Numbers and Identify Unwanted Calls, URL=https://spamcalls.net/en/, undated, 9 pages.

* cited by examiner

*Primary Examiner* — Amal S Zenati

(57) ABSTRACT

The present disclosure describes techniques for determining whether a communication request is associated with a legitimate communication or spoof communication, prior to establishing the connection. A Parallel Path Caller Verification (PPCV) controller is described that is configured to intercept a communication request from an originating device and generate a proof-of-identity (PoI) message for delivery to the originating device. Upon receipt of a reply message that is responsive to the PoI message, the PPCV controller may determine whether the communication is a legitimate communication. If the communication is determined as legitimate, the PPCV controller may establish a communication based on the communication request.

20 Claims, 6 Drawing Sheets

PARALLEL PATH CALLER VERIFICATION CONTROLLER

BACKGROUND

Present-day, the use of mobile devices is widespread. Continuous advancements in mobile device technology lend to improvements in productivity and quality of life by enhancing user access to real-time communications in a variety of environmental settings. Users may selectively communicate via a text or voice-based communication medium in a variety of environmental settings, such as a home, workplace, school, or any other suitable location. However, mobile devices are highly susceptible to nuisance communications by unspecified individuals that target some users for unwanted or ill-intentioned purposes. Unspecified individuals may include spammers that impersonate a known person's identity (e.g., phone number) for fraudulent or nuisance purposes.

Accordingly, as mobile device technology continues to advance, legitimate subscribers of a telecommunication service may be increasingly subject to nuisance communications from unspecified individuals that spoof the identity of a known individual.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
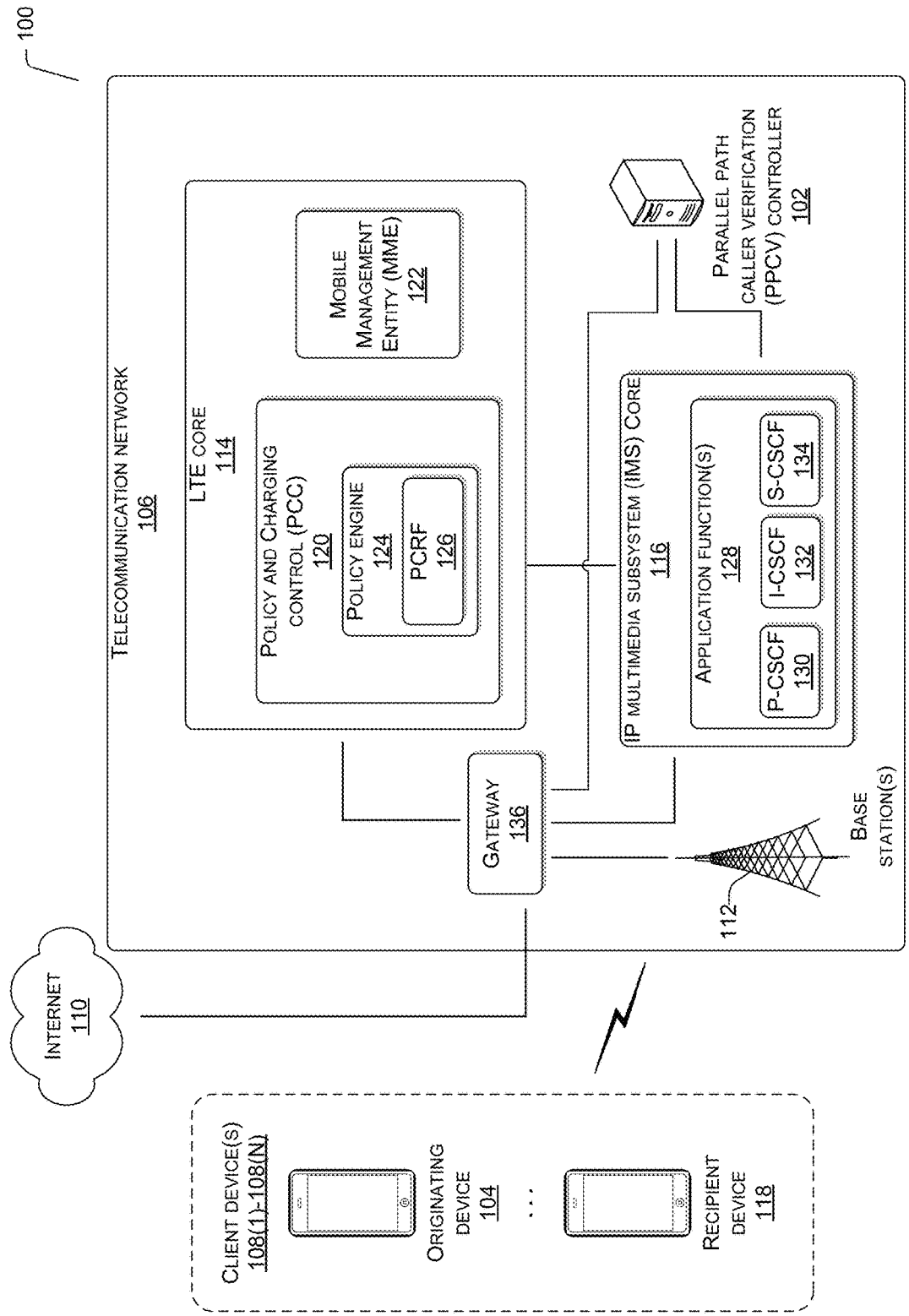
FIG. 1 illustrates a schematic view of a computing environment for the operation of the Parallel Path Caller Verification (PPCV) controller.

This disclosure describes techniques for determining whether an incoming communication request is a spoof communication. Ill-intentioned third parties may initiate a communication from a phone number that appears to be listed from a subscriber of a telecommunication network, despite the communication having been initiated from a different telephone number. This practice, also known as caller ID spoofing, may provide a client with the misplaced assurance of the identity of a third party and/or origin of the communication.

Accordingly, a Parallel Path Caller Verification (PPCV) controller is described that is configured to intercept a communication request from an originating device and generate a proof-of-identity (PoI) message for delivery to the originating device. Upon receipt of a reply message that is responsive to the PoI message, the PPCV controller may determine whether the communication is legitimate. If the communication is determined as legitimate, the PPCV controller may re-direct the intercepted communication request to the I/S-CSCF of the telecommunications network to establish the communication.

In one embodiment, the PPCV controller may intercept, from an originating device, a communication request to initiate communication with a recipient device. The communication request may relate to establishing a voice communication, a video communication, or a Short Message Service (SMS) communication.

The PPCV controller may generate a proof-of-identity (PoI) message for delivery to the originating device. The PoI message is intended to determine whether the communication request is associated with a legitimate communication or a spoof communication. A spoof communication may comprise a communication sent by a third-party device that purports to have been sent by a different, originating device. In other words, the communication request sent by the third-party device includes a Caller Verification associated with the originating device, rather than a Caller Verification that is associated with the third-party device, itself.

The PoI message may comprise of one a challenge-response test or a code request. A challenge-response test may involve a Completely Automated Public Turing test to tell Computers and Humans Apart (CAPTCHA), which is used to determine whether or not a user of the mobile device is human. For example, a CAPTCHA test may involve presenting a user with a distorted image and requesting the user identify the sequence of characters. Alternatively, a CAPTCHA test may involve presenting a user with multiple images and requesting the user identify images that include a specific object (e.g., traffic light, fire hydrant, etc.).

The code request may involve presenting the user with a code and requesting the user transmit a reply message that includes the code. For example, the PoI message may include the code "GOTCHA," and request the user transmit a reply to the PoI message that includes the code text, namely "GOTCHA."

In one embodiment, the PPCV controller may transmit the PoI message via the same communication medium as the communication request. For example, if the PPCV controller intercepts an SMS communication request, the PPCV controller may transmit the PoI message via an SMS message.

In another embodiment, the PPCV controller may transmit the PoI message via a different communication medium relative to the communication request. For example, if the PPCV controller intercepts a voice or video communication request, the PCI controller may transmit the PoI message via an SMS message. Alternatively, if the PPCV controller intercepts an SMS message, the PCI controller may transmit the PoI message as a voice or video message. Referring to the latter, the PCI controller may generate a voice or video-based PoI message that recites a code and requests that the user repeat the code.

Moreover, the PPCV controller may configure the PoI message to indicate which communication medium the user of the originating device is to use to reply to the PoI message. In one embodiment, the communication medium for a reply message may be the same as the communication medium of the PoI message. For example, a PoI message sent as an SMS message may request a reply message be sent as an SMS reply to the PoI message. In another embodiment, the PPCV controller may configure a PoI message that is sent as a voice or video communication, to request a reply message be audibly annunciated during the voice or video communication. For example, a voice-based PoI communication may request a user of an originating device to repeat an annunciated character string, to which the user would audibly reply by annunciating the character string during the voice-based PoI communication. Similarly, a video-based PoI communication may request a user of an originating device to repeat a character string that is annunciated and/or presented on a display of the originating device. In this latter example, the user would audibly reply by annunciating the character string during the video-based PoI communication.

In another embodiment, the communication medium for the reply message may be different from the communication medium of the PoI message. For example, the PPCV controller may configure the PoI message that is sent via a voice or video communication to transmit a reply, to a specified number, via an SMS message.

Upon receipt of a reply message that is responsive to a PoI message, the PPCV controller may analyze the reply message to determine whether the communication is legitimate. If the reply message includes a correct response to the challenge-response request within the PoI message, the PPCV controller may infer that the communication is legitimate. In doing so, the PPCV controller may re-direct the intercepted communication request to the I/S-CSF of the telecommunications network, to establish the communication between the originating device and recipient device.

If, however, the PPCV controller receives an incorrect response, the PPCV controller may selectively transmit a second PoI message to the originating device to lessen the risk that the incorrect response was due to human error. Alternatively, the PPCV controller may infer that the incorrect response is representative of a spoof communication and in doing so, reject the communication request.

It is noteworthy that an incorrect response may comprise a non-response to the PoI message. For example, if the PPCV controller determines that a reply message has not been received within a predetermined time interval of delivering a PoI message to the originating device, the PPCV controller may infer that the lack of response is representative of a spoof communication, and in doing so, reject the communication request. The predetermined time interval may be any time interval set by an operator of the PPCV controller.

In various embodiments, the PPCV controller may determine whether to generate a PoI message based on analysis of historical communication metadata associated with the recipient device. The PPCV controller may access a data store to retrieve a recipient profile associated with the recipient device. The recipient profile may include the historical communication metadata. Further, the data store may be native to the PPCV controller or may reside on a remote server that is communicatively coupled to the PPCV controller.

The historical communication metadata may indicate the day of the week, time of day, geolocation, call duration, or any suitable combination thereof, of communication requests initiated with the recipient device. In some examples, the historical communication metadata may also include indications of whether communication requests were historically verified as being legitimate communications or spoof communications.

In one embodiment, the PPCV controller may analyze historical communication metadata associated with the recipient device to determine that a communication request from the originating device is initiated on a different day, time, geolocation, or any suitable combination thereof. On that basis, the PPCV controller may infer that the communication request is illegitimate, and in doing so, generate the PoI message for delivery to the originating device to verify the legitimacy of the communication request.

Alternatively, the PPCV controller may determine that the communication request is likely legitimate, based on the originating device having initiated the communication on the same day, time, and geolocation, as has previously been custom according to the historical communication metadata. In this instance, the PPCV controller may forgo generating the PoI message and instead re-direct the intercepted communication request to the I/S-CSF of the telecommunications network, to establish the communication between the originating device and the recipient device.

In some embodiments, the PPCV controller may generate a communication verification model to infer the legitimacy of an initiated communication. The PPCV controller may use one or more trained machine-learning algorithms to generate the communication verification model based on historical communication metadata associated with a recipient device. In this way, the PPCV controller may correlate a communication request with data points of the communication verification model to determine whether a communication request is likely associated with a legitimate communication or a spoof communication. If the PPCV controller infers that the communication request is likely legitimate, the PPCV controller may forgo generating the PoI message and instead re-direct the intercepted communication request to the I/S-CSF of the telecommunications network to establish the communication between the originating device and the recipient device. Alternatively, if the PPCV controller infers that the communication is likely spoofed, the PPCV controller may generate the PoI message.

Moreover, the PPCV controller may assign a verification score to a communication request based on an analysis of the communication request. The verification score may reflect the likelihood that the communication request is likely associated with a legitimate communication. A verification score that is above a predetermined verification threshold may indicate that the communication request is likely a legitimate communication. Similarly, a verification score that is below a predetermined verification threshold may indicate that the communication request is likely a spoof communication.

In some embodiments, the PPCV controller may interact with a recipient device following the completion of a communication to verify whether the communication was a legitimate communication or a spoof communication. The PPCV controller may detect the completion of the communication and analyze metadata associated with the communication to infer a likelihood that the communication was legitimate. For example, if the call duration was less than five seconds, the PPCV controller may infer that the relatively short call duration may be indicative of a spoof communication. In these instances, the PPCV controller may generate a feedback request for the delivery to the recipient device based on the likelihood of the communication legitimacy being less than a predetermined legitimacy threshold. The predetermined legitimacy threshold may be set by an operator of the PPCV controller and may reflect a minimum call duration above which a communication is likely to be deemed, legitimate.

The feedback request may be sent via an SMS message and may request a feedback reply to indicate whether a particular communication was a legitimate communication or a spoof communication. The PPCV controller may process the feedback reply, and in doing so, update a recipient device profile indicating that the particular communication was a legitimate or spoof communication. The update to the recipient device profile becomes part of the historical communication metadata associated with the recipient device.

Additionally, the PPCV controller may retrieve, from a data store, a communication verification model associated with the recipient device. The communication verification model is configured to infer the legitimacy of communication requests associated with the recipient device. In doing so, the PPCV controller may update the communication verification model using the feedback reply message received from the recipient device.

The term "legitimate communication" is used throughout this disclosure to describe a communication that has been initiated by an originating device that is legitimately associated with the caller ID presented in the communication request. For example, Joe may use his mobile device (e.g., originating device) to initiate a legitimate communication with Jane, whereby Joe's caller ID (e.g., phone number) would appear on a display of Jane's mobile device (e.g., recipient device) as the caller.

The term "spoof communication" is used throughout this disclosure to describe a communication that is initiated by an originating device that misrepresents its association with the caller ID presented in the communication request. For example, a third party, Trevor, may use his mobile device (e.g., originating device) to initiate a spoof communication with Jane, which involves initiating the communication request from Trevor's mobile device (e.g., originating device) but causing the display of a different caller ID, such as Joe's caller ID (e.g., phone number), on the display of Jane's mobile device.

Further, the term "techniques," as used herein, may refer to system(s), method(s), computer-readable instruction(s), module(s), algorithms, hardware logic, and/or operation(s) as permitted by the context described above and through the document.

FIG. 1 illustrates a schematic view of a computing environment for the operation of the Parallel Path Caller Verification (PPCV) controller. The PPCV controller 102 may be configured to intercept a communication request from an originating device 104 to determine a likelihood of whether the communication request is associated with a legitimate communication or a spoof communication. If the PPCV controller 102 infers that the communication request is likely associated with a spoof communication, the PPCV controller 102 may generate a PoI message for delivery to the originating device 104. The PoI message is intended to verify whether the originating device 104 sent the communication request.

The computing environment 100 may comprise a telecommunication network 106 that interacts with the client device(s) 108(1)-108(N) and the internet 110. The telecommunication network 106 corresponds to a Long-Term Evolution (LTE) network. However, variations and modifications can be made such that the telecommunication network 106 corresponds to a 2G, 3G, or 5G-New Radio network. Further, the client device(s) 108(1)-108(N) may include an originating device 104 that initiates a communication request and a recipient device that is intended to receive the communication request. The client device(s) 108(1)-108(N) may include any sort of electronic device, such as a cellular phone, a smartphone, a tablet computer, an electronic reader, a media player, a gaming device, a personal computer (PC), a laptop computer, etc. The client device(s) 108(1)-108(N) may include a subscriber identity module (SIM), such as an eSIM, to identify the client device(s) 108(1)-108(N) to a telecommunication service provider network (also referred to herein, as "telecommunication network").

The telecommunication network 106 may include base station node(s) 112, an LTE core 114, an IP Multimedia Subsystem (IMS) core 116, and the PPCV controller 102. The base station node(s) 112 are responsible for handling voice and data traffic via air interfaces between the IMS core 116 and the client device(s) 108(1)-108(N), such as the originating device 104 and the recipient device 118.

The LTE core 114 may further include a Policy and Charging Controller (PCC) 120 and a Mobile Management Entity (MME) 1122. The PCC 120 may enable detection of communication service data flow and provide parameters for policy control and/or charging control. In the illustrated example, the PCC 120 may include a policy engine 124, such as a Policy and Charging Rules Function (PCRF) 126. The MME 122 performs signal functions in the LTE core 114. The MME 122 can send and receive signaling information needed to set up a bill, and address calls to the base station node(s) 112 and contains security protocols for authentication and authorization.

The IMS core 116 may provide telecommunication and data communication services to multiple client devices, such as an LTE-compatible client device, collectively referred to as client device(s) 108(1)-108(N). The IMS core 116 may include application function(s) (AF) 128, such as a Proxy Call Session Control Function (P-CSCF) 130, an Interrogating Call Session Control Function (I-CSCF) 132, and a Serving Call Session Control Function (S-CSCF) 132. The P-CSCF 130 behaves as a proxy by accepting requests and serving them internally or forwarding them to the I-CSCF 132 and S-CSCF 134. The S-CSCF 134 acts as a Session Initiation Protocol (SIP) registrar and in some cases as a SIP redirect server. The S-CSCF 134 is responsible for processing the location registration of a client device, client authentication, and call routing and processing. The I-CSCF 132 is tasked with selecting an S-CSCF 134 for serving an initial SIP request, particularly when a client device initiating the request does not know which S-CSCF 134 should receive the request.

Further, a gateway 136 may interface with the IMS core 116 and the PPCV controller 102. The gateway 136 may include one or more servers and related components that are tasked with providing connectivity between the IMS core 116, the client device(s) 108(1)-108(N), the PPCV controller 102, and the internet 110. More specifically, gateway 136 may act as a point of entry and exit for network traffic into the telecommunication network 106.

The PPCV controller 102 may intercept a communication request at an I-CSCF 132 or S-CSCF 134 of the IMS core 116. The STI proxy server may intercept the SIP INVITE message at the P-CSCF 130 to limit exposure of the telecommunication network 106 to volumes of fraudulent or nuisance call requests. In one embodiment, the communication request may comprise a SIP INVITE message. However, other embodiments that include different communication request formats are possible The PPCV controller 102 may interact with the originating device 104 via the gateway 136 to deliver the PoI message and in response, receive a reply message. If the PPCV controller 102 determines that a communication request initiated by the originating device 104 is a legitimate communication, the PPCV controller 102 may re-direct the communication request to the point at which it was intercepted, namely the I-CSCF 132 or the S-CSCF 134, or in other instances, the P-CSCF 130. If the PPCV controller 102 determines that the communication request is a spoof communication, the PPCV controller 102 may delete the communication request, thereby causing its termination.

Moreover, the PPCV controller 102 may interact with the recipient device 118 via the gateway 136 to deliver a feedback request, and in response receive a feedback reply. The feedback request may relate to determining whether a completed communication associated with the recipient device was a legitimate communication or a spoof communication.

The PPCV controller 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices via one or more network(s). The one or more network(s) may include public networks such as the Internet, private networks such as an institutional and/or personal intranet, or some combination of private and public networks. The one or more network(s) can also include any type of wired and/or wireless network, including but not limited to local area network (LANs), wide area networks (WANs), satellite networks, cable networks. Wi-Fi networks, Wi-Max networks, mobile communications networks (e.g. 3G, 4G, LTE, 5G NR-LTE, and so forth), or any combination thereof.

While this disclosure describes the PPCV controller 102 as being part of the LTE core 114, further variations and modifications can be made such that the PPCV controller 102 is remotely executable on separate servers or separate devices that are external to the telecommunication network 106. One of ordinary skill in the art would appreciate that such an embodiment remains within the scope of the invention, as defined in the appended claims.

Figure 2:
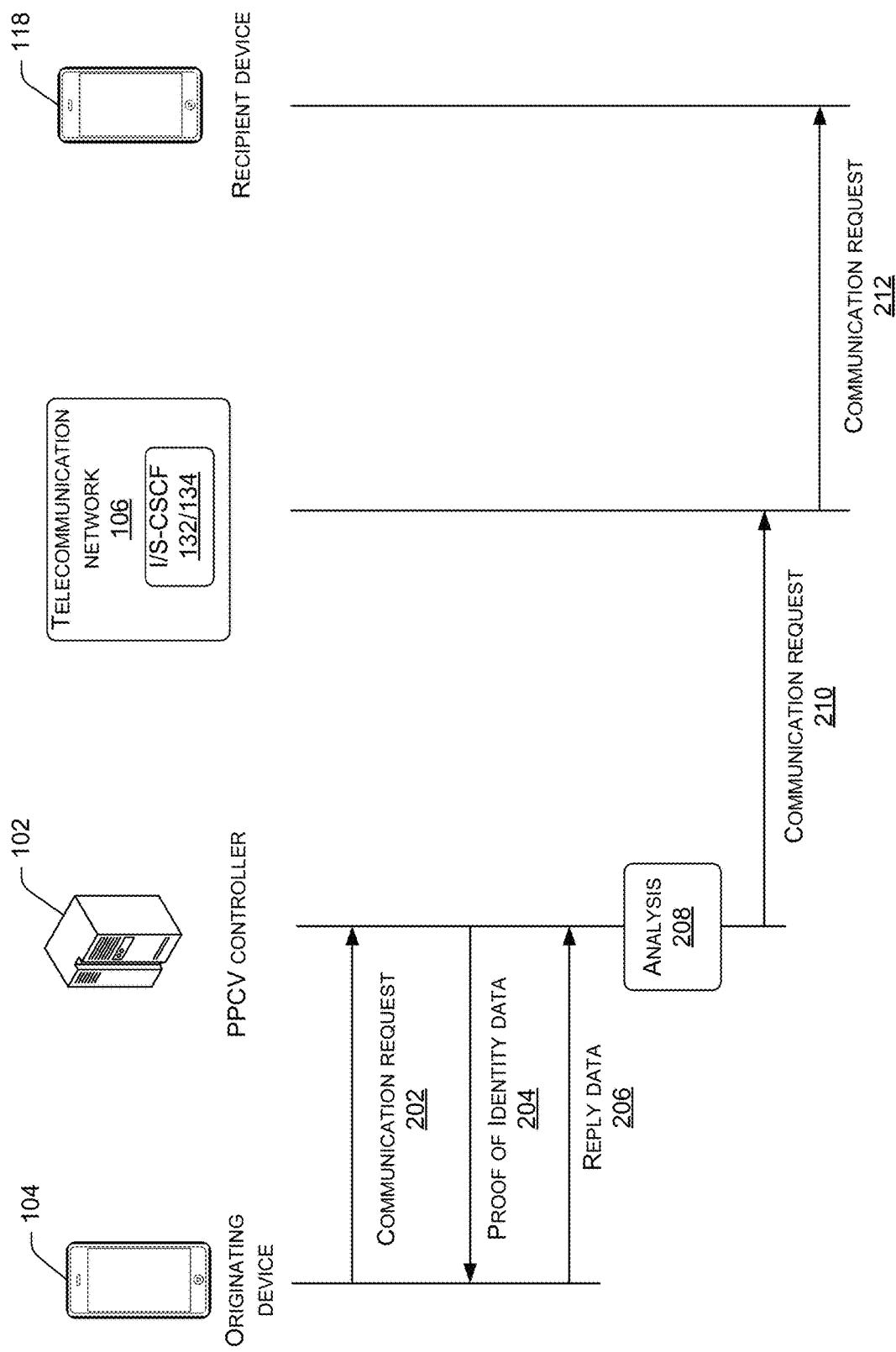
FIG. 2 illustrates a block diagram of an exemplary process of a PPCV controller intercepting a communication request initiated by an originating device to establish a communication with a recipient device.

FIG. 2 illustrates a block diagram of an exemplary process of a PPCV controller intercepting a communication request initiated by an originating device to establish a communication with a recipient device. At 202, the PPCV controller 102 may intercept a communication request initiated by an originating device. In one embodiment, the communication request may comprise a SIP INVITE message.

At 204, the PPCV controller 102 may transmit a PoI message to the originating device to determine whether the communication request is likely associated with a legitimate communication or a spoof communication. The purpose of the PoI message is to verify whether the communication request sent by the originating device is a legitimate communication or a spoof communication. A spoof communication comprises a communication sent by a third-party device that purports to have been sent by a different, originating device. In other words, the communication request sent by the third-party device includes a Caller Verification associated with the originating device, rather than itself. The PoI message may comprise a challenge-response test, whereby a user of the originating device is prompted for a reply to a challenge. The challenge may comprise a CAPTCHA test or a request for the user to send a reply with a code that is presented in the PoI message.

At 206, the PPCV controller 102 may receive a reply message that is responsive to the PoI message. In doing so, the PPCV controller 102 may analyze the reply message to determine whether the communication request is a legitimate communication or a spoof communication.

At 208, the PPCV controller 102 may determine that the communication request is a legitimate communication. In doing so, the PPCV controller 102, at 210, may re-direct the communication request to the I-CSCF 132 or S-CSCF 134 of the telecommunication network 106. If the PPCV controller 102 determines that the communication request is a spoof communication, the PPCV controller 102 may elect to delete the communication request, thereby terminating the communication request. In this instance, the communication request is rejected and a communication between the originating device and the recipient device is not established.

At 212, in response to receiving the communication request from the PPCV controller 102, the I-CSCF 132 or S-CSCF 134 may perform acts to establish a communication between the originating device and a recipient device, based at least in part on the communication request.

Figure 3:
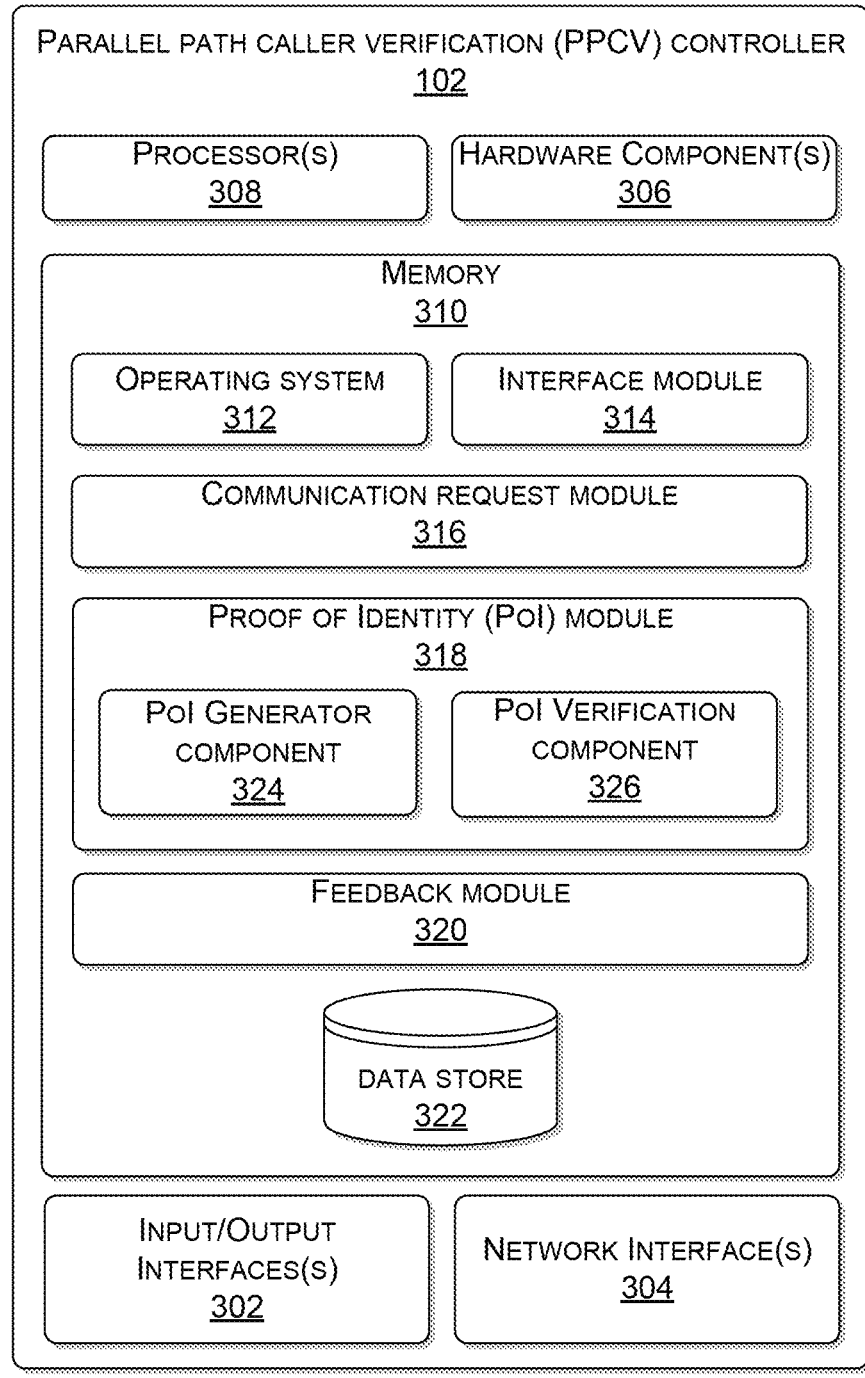
FIG. 3 illustrates various components of an example PPCV controller.

FIG. 3 illustrates various components of an example PPCV controller. In the illustrated example, the PPCV controller 102 may perform acts to infer the legitimacy of a communication request.

The PPCV controller 102 may include input/output interface(s) 302. The input/output interface(s) 302 may include any suitable type of output interface known in the art, such as a display (e.g., a liquid crystal display), speakers, a vibrating mechanism, or a tactile feedback mechanism. Input/output interface(s) 302 also includes ports for one or more peripheral devices, such as headphones, peripheral speakers, or a peripheral display. Further, the input/output interface(s) 302 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the PPCV controller 102 may include network interface(s) 304. The network interface(s) 304 may include any suitable sort of transceiver known in the art. For example, the network interface(s) 304 may include a radio transceiver that performs the function of transmitting and receiving radio frequency communications via an antenna. Also, the network interface(s) 304 may include a wireless communication transceiver and a near-field antenna for communicating over unlicensed wireless Internet Protocol (IP) networks, such as local wireless data networks and personal area networks (e.g., Bluetooth or near field communication (NFC) networks). Further, the network interface(s) 304 may include wired communication components, such as an Ethernet port or a Universal Serial Bus (USB). Hardware component(s) 306 may include additional hardware interface, data communication hardware, and data storage hardware.

Further, the PPCV controller 102 may include one or more processor(s) 308 that are operably connected to memory 310. In at least one example, the one or more processor(s) 308 may be a central processing unit(s) (CPU), graphics processing unit(s) (GPU), or both a CPU and GPU or any suitable sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 308 may also be responsible for executing all computer applications stored in the memory, which can be associated with common types of volatile (RAM) and/or non-volatile (ROM) memory.

In some examples, memory 310 may include system memory, which may be volatile (such as RAM), non-volatile (such as ROM, flash memory, etc.), or some combination of the two. The memory may also include additional data storage devices (removable and/or non-removable) such as, for example, magnetic disks, optical disks, or tape.

The memory 310 may further include non-transitory computer-readable media, such as volatile and nonvolatile, removable, and non-removable media implemented in any suitable method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any suitable non-transitory medium which can be used to store the desired information.

In the illustrated example, the memory 310 may include an operating system 312, an interface module 314, a communication request module 316, a PoI module 318, a feedback module 320, and a data store 322. The operating system 312 may be any suitable operating system capable of managing computer hardware and software resources. The operating system 312 may include an interface layer that enables applications to interface with the input/output interface(s) 302 and the network interface(s) 304.

The interface module 314 may be configured to interact with the I-CSF or S-CSF of a telecommunications network to intercept a communication request initiated by an originating device. In response to determining that a communication request is legitimate (e.g., by one of the communication request module 316 or the PoI module 318), the interface module 314 may re-direct the intercepted communication request to the I/S-CSF of the telecommunications network, to establish the communication between an originating device and a recipient device.

Further, the interface module 314 may transmit a PoI message to an originating device to determine the legitimacy of the communication request. In turn, the interface module 314 may receive a reply message from the originating device that is responsive to the PoI message. The interface module 314 may also transmit a feedback request to a recipient device associated with a completed communication. The feedback request is intended to clarify whether the completed communication was a legitimate communication or a spoof communication. In response, the interface module 314 may receive a feedback reply message from the recipient device.

In some embodiments, the interface module 314 may interact with a remote data repository to access a recipient profile associated with the recipient device. The recipient profile may include historical communication metadata, which may be used to determine the likelihood that a communication request is likely associated with a legitimate communication. In one embodiment, the remote data repository may reside within the core network of the telecommunications network. In another embodiment, the remote data repository may reside outside the core network but remain accessible via the telecommunications network.

Moreover, the interface module 314 may interact with a recipient device to capture communication metadata associated with a completed communication. Doing so permits the feedback module 320 to determine whether the completed communication was a legitimate communication or a spoof communication. It is noteworthy that in some instances, the communication metadata associated with a completed communication may be derived from historical communication metadata.

The communication request module 316 may employ one or more machine-learning algorithms to analyze a communication request to determine whether to generate a PoI message to determine a legitimacy of a communication request. The communication request module 316 may access a recipient profile associated with a recipient device to retrieve historical communication metadata. Without limitation, the historical communication metadata may include i) a record of communication requests received by the recipient device over a predetermined time interval, ii) indications of historical communication requests and completed communications that have been verified as legitimate communications or spoof communications, iii) originating device identifiers associated with communication requests and completed communications, iv) a day of the week and time of day that a communication request is initiated by an originating device, and v) the geolocation of an originating device at the time of initiating a communication request.

The communication request module 316 may employ one or more machine-learning algorithms to analyze a communication request relative to the historical communication metadata associated with the recipient device to determine a likelihood that the communication request is likely associated with a legitimate communication of a spoof communication. In turn, if the communication request module 316 determines that the communication request is likely a spoof communication, it may interact with the PoI module 318 to generate a PoI message for delivery to the originating device. Otherwise, if the communication request module 316 determines that the communication request is likely a legitimate communication, it may forgo interacting with the PoI module 318, and instead, interact with the interface module 314 to re-direct the intercepted communication request to the I/S-CSF of the telecommunications network to establish the communication between the originating device and the recipient device.

The communication request module 316 may assign a verification score to a communication request, based at least in part on analysis of the communication request. The verification score may alpha-numeric (e.g., 0 to 10, or A to F), descriptive (e.g., low, medium, or high), based on color (e.g., red, yellow, or green), or any other suitable rating scale. A high verification score (e.g., 7 to 10, high, or green) may indicate that a communication is likely to be legitimate. Here, the communication request module 316 may forgo generating a PoI message and instead re-direct the intercepted communication request to the I/S-CSF of the telecommunications network, to establish the communication between the originating device and the recipient device. A medium verification score (e.g., 4 to 6, medium, or yellow) may indicate that a communication may be legitimate. Here, the communication request module 316 may selectively generate a PoI message for delivery to the originating device. A low verification score (e.g., 1 to 3, low, or red) may indicate that the communication is likely a spoof communication. The communication request module 316 may generate a PoI message for delivery to the originating device.

The communication request module 316 may compare the verification score to a predetermined verification threshold to determine whether the communication request is a spoof communication. The predetermined verification threshold may be set by an operator of the PPCV controller or the telecommunications network. A verification score that is greater than or equal to the predetermined verification threshold may indicate that the communication request is likely associated with a legitimate communication. Alternatively, a verification score that is less than the predetermined verification threshold may indicate that the communication request is likely associated with a spoof communication.

In some embodiments, the communication request module 316 may generate a communication verification model to infer the legitimacy of an initiated communication. The PPCV controller may use one or more trained machine-learning algorithms to generate the communication verification model based on historical communication metadata associated with a recipient device. In this way, the communication request module 316 may correlate a communication request with data points of the communication verification model to determine whether the communication request is likely associated with a legitimate communication or a spoof communication.

In some examples, the communication request module 316 may interact with the feedback module 320 to update the communication verification model with feedback reply data captured from a recipient device. As more historical communication metadata and feedback reply data become available, a continuously more accurate data model can be developed.

The PoI module 318 may further include a PoI generator component 324 and a PoI verification component 326. The PoI generator component 324 may be configured to generate a PoI message for delivery to an originating device. The PoI message may comprise a challenge-response test, such as a CAPTCHA test. Alternatively, the PoI message may involve presenting a user of an originating device with a code and requesting the user transmit a reply message that includes the code.

The PoI generator component 324 may further determine the communication medium of the PoI message, based on the communication medium of the communication request. For example, if the communication request is associated with establishing a voice or video communication, the PoI generator component 324 may elect to generate a PoI message using an SMS communication medium. Doing so ensures that the communication request (e.g., voice or video communication) may be intercepted, and remain pending, while the PoI message is sent via an alternate SMS communication medium.

In another example, if the communication request is associated with establishing an SMS communication, the PoI generator component 324 may elect to generate a PoI message using one of an SMS, voice, or video communication medium. Here, the communication request (e.g., SMS communication) may be intercepted, and remain pending, while the PoI message is sent via an SMS, or voice or video communication medium.

The PoI verification component 326 may be configured to verify whether a reply message to a PoI message is correct. If the reply message correctly responds to the challenge presented in the PoI message, the PoI verification component 326 may infer that the communication request is likely associated with a legitimate communication. Otherwise, an incorrect response may indicate that the communication request is likely associated with a spoof communication. It is noteworthy that for a non-response to a PoI message (e.g., no reply message is received), the PoI verification component 326 may infer that the communication request is likely associated with a spoof communication.

If the PoI verification component 326 determines that the communication request is likely associated with a legitimate communication, the PoI verification component 326 may transmit a message to the interface module 314 to re-direct the communication request to the I/S-CSCF of the telecommunication network to establish the communication between the originating device and the recipient device. Alternatively, if the PoI verification component 326 determines that the communication request is likely associated with a spoof communication, the PoI verification component 326 may transmit a message to the interface module 314 to reject the communication request.

The feedback module 320 may employ one or more trained machine-learning algorithms to analyze the communication metadata of a completed communication to determine whether the completed communication was likely a legitimate communication or a spoof communication. For example, if the call duration was less than five seconds, the feedback module 320 may infer that the relatively short call duration may be indicative of a spoof communication. Other indications may include communications that occur at out-of-the-ordinary times and geolocations.

For example, consider a recipient device that typically receives a communication from an originating device on a particular day of the week and/or a particular time of day. If the recipient device receives a communication from the originating device on a different day of the week or at a different time of day, the feedback module 320 may flag the communication request as a potential spoof communication. Similarly, if a recipient device typically receives a communication from an originating device while the originating device is located at a particular geolocation (e.g., home, work, school, etc.), and if the recipient device receives a communication from the originating device (e.g., or purportedly from the originating device) while the originating device is at a different location (e.g., based on the SIP INVITE message), the feedback module 320 may flag the communication request as a potential spoof communication.

The feedback module 320 may generate a feedback request for the delivery to the recipient device to determine whether the completed communication was a legitimate communication or a spoof communication. The feedback request may posit the question of whether a particular communication was legitimate and solicit a feedback reply. In response to receiving a feedback reply message, the feedback module 320 may process the feedback reply to determine whether the completed communication was a legitimate or spoof communication, and in doing so, update a recipient device profile (e.g., historical communication metadata) to indicate the same. Additionally, the feedback module 320 may interact with the PoI module 318 to update a communication verification model associated with the recipient device with the feedback reply message.

The data store 322 may include recipient profiles associated with recipient devices, historical communication metadata associated with recipient devices, communication verification models associated with recipient devices, and any other suitable data that is pertinent to an operation of the PPCV controller 102.

Also, the PPCV controller 102, via various modules and components, may make use of one or more trained machine-learning algorithms such as supervised learning, unsupervised learning, semi-supervised learning, naive Bayes, Bayesian network, decision trees, neural networks, fuzzy logic models, and/or probabilistic classification models.

Figure 4:
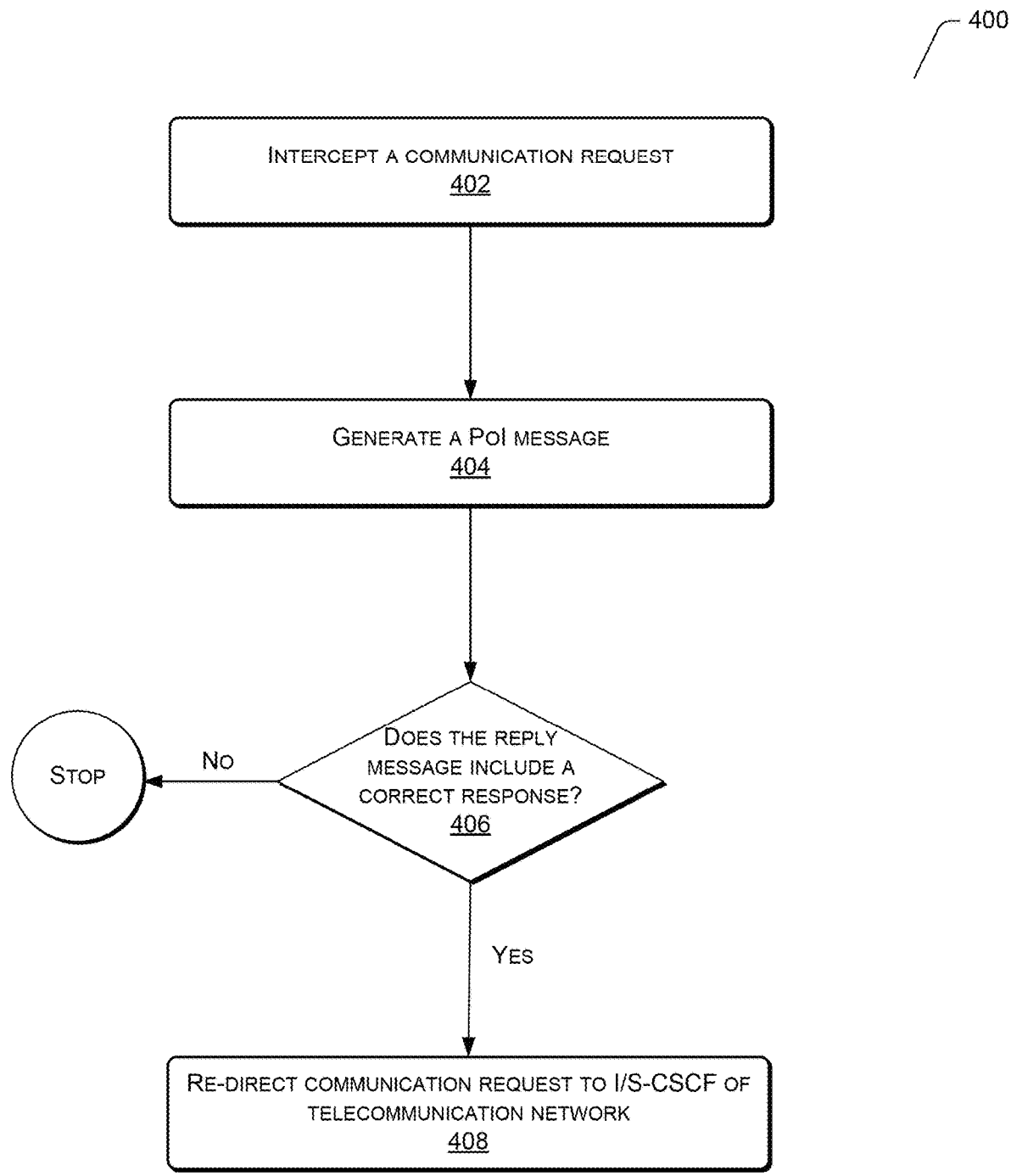
FIG. 4 illustrates an exemplary process for initiating a communication between an originating device and a recipient device based on the legitimacy of the communication request.
Figure 5:
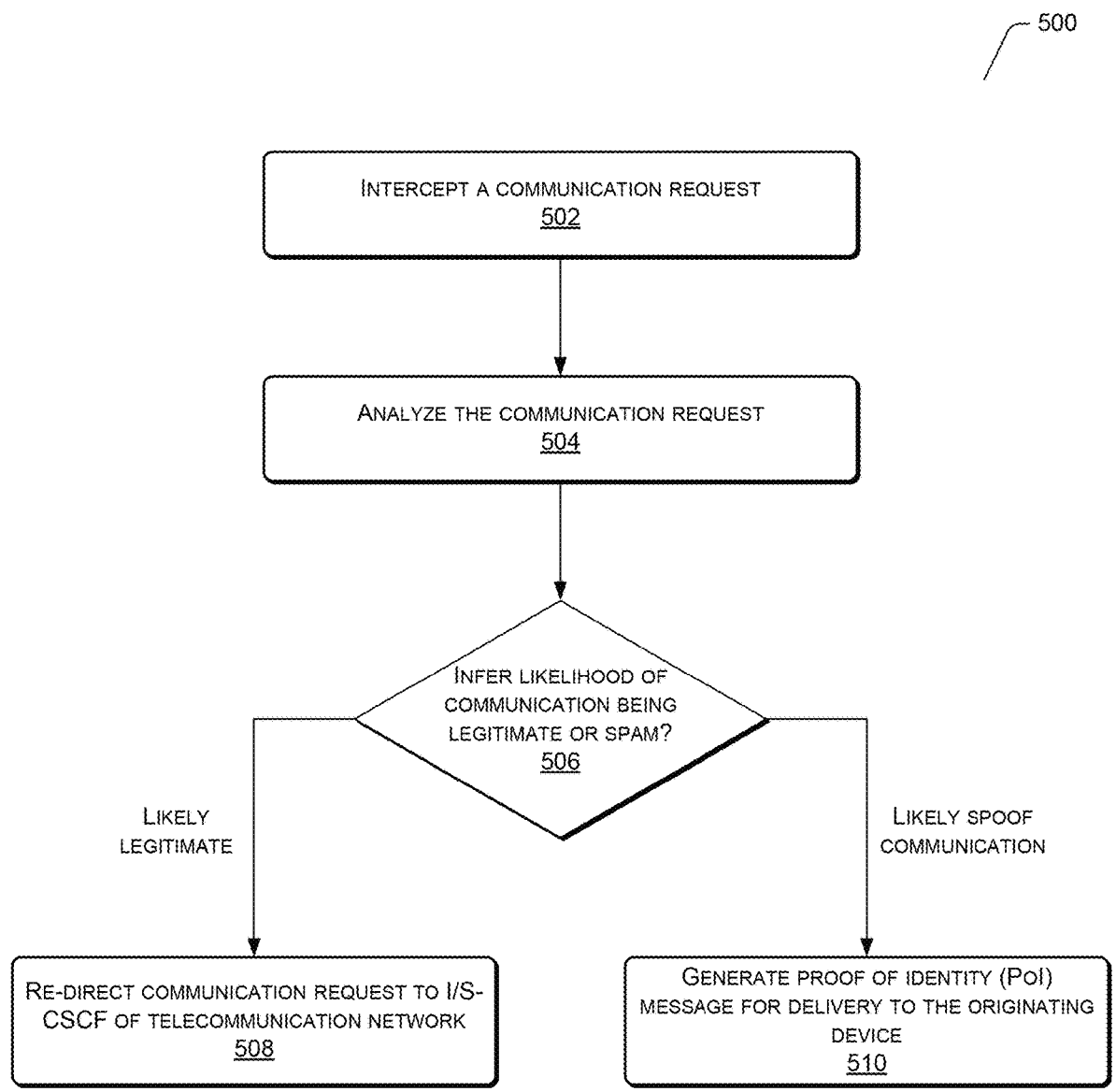
FIG. 5 illustrates an exemplary process for determining whether to generate a PoI message to infer the legitimacy of a communication.
Figure 6:
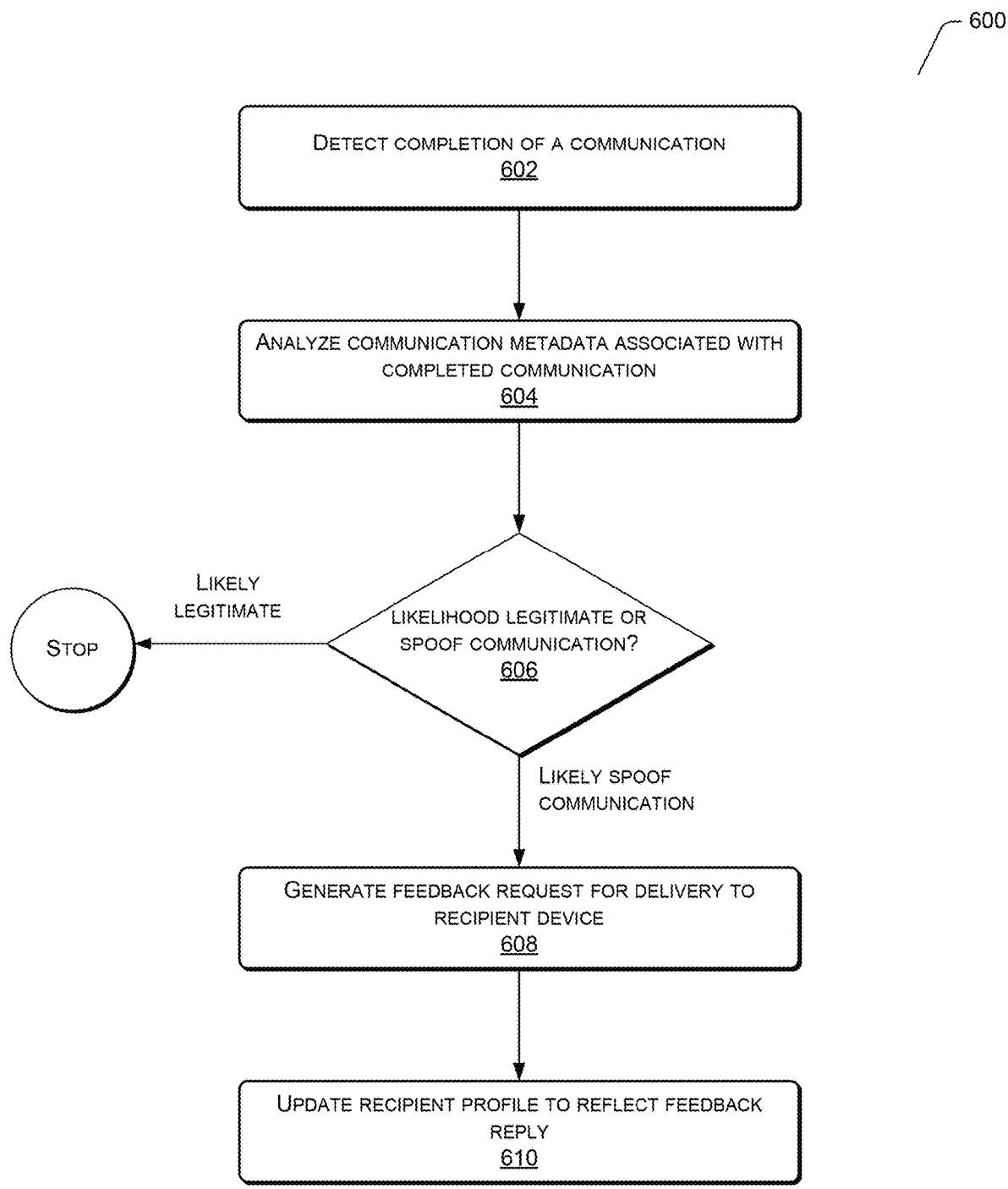
FIG. 6 illustrates an exemplary process for generating a feedback request for the delivery to a recipient device to determine whether a completed communication was a legitimate communication or a spoof communication.

FIGS. 4, 5, and 6 present processes 400, 500, and 600 that relate to operations of the Parallel Path Caller Verification Controller (PPCV) 102. Each of processes 400, 500, and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400, 500, and 600 are described with reference to the computing environment 100 of FIG. 1.

FIG. 4 illustrates an exemplary process for initiating a communication between an originating device and a recipient device based on the legitimacy of the communication request. For example, the PPCV controller may intercept a communication request initiated by an originating device and determine whether the communication request is associated with a legitimate communication or a spoof communication. Process 400 is described from the perspective of the PPCV controller.

At 402, the PPCV controller may intercept a communication request from an originating device to initiate a communication with a recipient device. The PPCV controller may intercept the communication request at an I/S-CSCF of a telecommunication network. In one example, the communication request may correspond to a SIP INVITE message. The SIP INVITE message may include an identifier associated with the originating device, a timestamp, a date stamp, a geolocation of the originating device at the time of initiating the communication request.

At 404, the PPCV controller may generate a PoI message for delivery to the originating device to verify the legitimacy of the communication request. The PoI message may comprise a challenge-response test that is intended to solicit a reply from the originating device. The challenge-response test may comprise a CAPTCHA test. Alternatively, the PoI message may include an alpha-numeric code and a request for the user of the originating device to transmit a reply message that includes the code.

At 406, the PPCV controller may determine whether the reply message includes a correct response to the PoI message. If the reply message includes a correct response to the PoI message, process 400 may proceed to 408. Otherwise, if the reply message does not include a correct response, process 400 may proceed to 410. At 410, the PPCV controller rejects the communication request. It is noteworthy that a non-response to the PoI message represents an incorrect response.

At 408, the PPCV controller may re-direct the communication request to the I/S-CSCF of the telecommunication network to establish the communication between the originating device and the recipient device. The communication may correspond to SMS messaging, or video or voice communications.

FIG. 5 illustrates an exemplary process for determining whether to generate a PoI message to infer the legitimacy of a communication. For example, the PPCV controller may preemptively analyze a communication request to ascertain the likelihood that the communication request has been initiated by the purported originating device. If the PPCV controller determines that the communication may be a spoof communication, that is a communication sent by an originating device other than the purported originating device, the PPCV controller may generate a PoI message for delivery to the purported originating device to verify the legitimacy of the communication request. Process 500 is described from the perspective of the PPCV controller.

At 502, the PPCV controller may intercept a communication request from an originating device to initiate a communication with a recipient device. In one example, the PPCV controller may intercept the communication request at an I/S-CSCF of a telecommunication network.

At 504, the PPCV controller may analyze the communication request relative to historical communication metadata associated with the recipient device. In one example, the PPCV controller may retrieve a recipient device profile that comprises historical communication metadata associated with the recipient device. In another example, the PPCV controller may retrieve a communication verification model associated with the recipient device that is developed based on the historical communication metadata.

At 506, the PPCV controller may employ one or more machine-learning algorithms to analyze a communication request relative to the historical communication metadata associated with the recipient device to determine a likelihood that the communication request is likely associated with a legitimate communication of a spoof communication. For example, consider a communication that typically occurs between an originating device and a recipient device on a particular day of the week and/or time of day. If the PPCV controller determines, via analysis, that the communication request is consistent with a customary communication (e.g., same originating device, the same day of the week, and/or time of day, originating device initiates the communication request at the same geolocation), the PPCV controller may infer that the communication is likely legitimate, and in doing so, forego generating a PoI message. In this instance, process 500 may proceed to 508. At 508, the PPCV controller may forgo generating a PoI message and instead re-direct the communication request to the I/S-CSCF of the telecommunication network to establish the communication between the originating device and the recipient device.

Otherwise, the PPCV controller may infer that the communication is likely a spoof communication (e.g., the communication request is initiated on a different day of the week, different time of day, originating device initiates the communication request at a different geolocation than what was previously custom). In this instance, process 500 may proceed to 510. At 510, the PPCV controller may generate a PoI message for delivery to the originating device.

FIG. 6 illustrates an exemplary process for generating a feedback request for the delivery to a recipient device to determine whether a completed communication was a legitimate communication or a spoof communication. Process 600 is described from the perspective of the PPCV controller.

At 602, the PPCV controller may detect the completion of a communication between an originating device and a recipient device. In doing so, the PPCV controller may retrieve communication metadata associated with completed communication from the recipient device.

At 604, the PPCV controller may employ one or more trained machine-learning algorithms to analyze the communication metadata and determine whether the completed communication was likely a legitimate communication or a spoof communication. Call duration may be instructive. For example, a call duration of approximately five seconds may indicate a spoof communication.

At 606, the PPCV controller may infer a likelihood whether the completed communication was a legitimate communication or a spoof communication. If the PPCV controller infers that the completed communication was likely legitimate, process 600 can terminate. Otherwise, if the PPCV controller may determine that the completed communication is likely a spoof communication, and process 600 may proceed to 608.

At 608, the PPCV controller may generate a feedback request for the delivery to the recipient device. The feedback request may be sent via an SMS message and may request a feedback reply to indicate whether a particular communication was a legitimate communication or a spoof communication.

At 610, the PPCV controller may update a recipient device profile to reflect a feedback reply that is responsive to the feedback request. The update to the recipient device profile becomes part of the historical communication metadata associated with the recipient device. The PPCV controller may further update a communication verification model associated with the recipient device. The communication verification model is used to infer the legitimacy of communication requests associated with the recipient device.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A system, comprising:
   one or more processors; and
   memory coupled to the one or more processors, the memory including one or more modules that are executable by the one or more processors to:
   intercept, at a controller of a telecommunication network, a communication request to initiate a communication with a recipient device that originated from an originating device, the controller intercepting the communication request at an application function in an IP Multimedia Subsystem (IMS) core of the telecommunication network;
   generate, at the controller of the telecommunication network, a proof-of-identity (PoI) message for delivery to the originating device that originated the communication request;
   receive, at the controller of the telecommunication network, a reply message that is responsive to the PoI message from the originating device;
   analyze, at the controller of the telecommunication network, the reply message to determine whether the communication is a legitimate communication; and
   establish, via the telecommunication network, the communication between the originating device and the recipient device by the controller of the telecommunication network redirecting the communication request that was intercepted to the application function of the IMS core in response to determining the communication is the legitimate communication.

2. The system of claim 1, wherein the communication corresponds to one of a voice communication, a video communication, or a Short Message Service (SMS) communication.

3. The system of claim 1, wherein the PoI message is transmitted via a PoI communication medium and the reply message is delivered via a reply communication medium, the PoI communication medium being different from the reply communication medium.

4. The system of claim 1, wherein the PoI message is transmitted via a PoI communication medium and the reply message is delivered via a reply communication medium, wherein the PoI communication medium corresponds to the reply communication medium.

5. The system of claim 1, wherein the PoI message comprises one of a challenge test or a code request, wherein the reply message to the challenge test comprises a response to the challenge test, and the reply message to the code request comprises a code that is included in the code request.

6. The system of claim 1, wherein the one or more modules are further executable by the one or more processors to:
   in response to determining that the communication is not a legitimate communication, reject, via the controller of the telecommunication network, the communication request to initiate the communication.

7. The system of claim 1, wherein the one or more modules are further executable by the one or more processors to:
   retrieve, from a data store, historical communication metadata of historical communications associated with the recipient device; and
   generate a communication verification model to infer a legitimacy of an initiated communication, based at least in part on the historical communication metadata, and wherein, to generate the PoI message is based at least in part on analysis of the communication request using the communication verification model.

8. The system of claim 1, wherein the one or more modules are further executable by the one or more processors to:
   detect, via the controller of the telecommunication network, a completion of the communication between the recipient device and the originating device;
   analyze, via the controller of the telecommunication network, metadata associated with the communication to infer a likelihood of legitimacy of the communication;
   generate, at the controller of the telecommunication network, a feedback request for delivery to the recipient device, based on the likelihood of legitimacy being less than a predetermined legitimacy threshold, the feedback request soliciting a feedback reply from the recipient device as to whether the communication originating from the originating device is legitimate or spoofed; and
   receive the feedback reply from the recipient device and update a recipient device profile of the recipient device based at least on the feedback reply received from the originating device.

9. A computer-implemented method, comprising:
under control of one or more processors:
intercepting, at a controller of a telecommunication network, a communication request to initiate a communication with a recipient device that originated from an originating device, the controller intercepting the communication request at an application function in an IP Multimedia Subsystem (IMS) core of the telecommunication network;
determining, at the controller of a telecommunication network, that the communication request is likely an illegitimate communication;
generating, at the controller of the telecommunication network, a proof-of-identity (PoI) message for delivery to the originating device; and
determining, at the controller of the telecommunication network, whether to establish the communication based on a receipt of a reply message to PoI message from the originating device.

10. The computer-implemented method of claim 9, further comprising:
retrieving, from a data store, historical communication metadata of historical communications associated with the recipient device; and
analyzing the communication request, based at least in part on the historical communication metadata, and
wherein, determining the communication request is likely an illegitimate communication is based at least in part on analysis of the communication request.

11. The computer-implemented method of claim 10, further comprising:
generating a communication verification model to infer a legitimacy of the communication request, based at least in part on the historical communication metadata, and
wherein, analyzing the communication request comprises correlating the communication request with data points of the communication verification model.

12. The computer-implemented method of claim 9, further comprising:
determining, at the controller of the telecommunication network, that the reply message has not been received within a predetermined time interval of delivering the PoI message to the originating device; and
rejecting, via the controller of the telecommunication network, the communication request based at least in part on non-receipt of the reply message.

13. The computer-implemented method of claim 9, further comprising:
in response to establishing the communication, detecting completion of the communication;
generating a feedback request for delivery to the recipient device;
receiving a feedback reply message that is responsive to the feedback request; and
updating a recipient device profile to indicate whether the communication was a legitimate communication based at least in part on the feedback reply message.

14. The computer-implemented method of claim 13, further comprising:
retrieving, from a data store, a communication verification model that is used to infer a legitimacy of communication requests associated with the recipient device; and
updating the communication verification model using the feedback reply message.

15. The computer-implemented method of claim 9, wherein the communication is to be established via a first communication medium and the PoI message is delivered via a second communication medium, the first communication medium and the second communication medium corresponding to one of a voice communication medium or an SMS communication medium, and
wherein the first communication medium is different from the second communication medium.

16. One or more non-transitory computer-readable media of a telecommunication network collectively storing computer-executable instructions that, when executed with one or more processors, collectively cause computers to perform acts comprising:
intercepting, at a controller of the telecommunication network, a communication request to initiate a communication with a recipient device that originated from an originating device, the controller intercepting the communication request at an application function in an IP Multimedia Subsystem (IMS) core of the telecommunication network;
retrieving, from a data store, historical communication metadata associated with the recipient device;
generating a communication verification model to infer a legitimacy of the communication, based at least in part on the historical communication metadata;
analyzing the communication request to determine a likelihood that the communication request is likely associated with a legitimate communication, based at least in part on the communication verification model;
in response to determining that the communication is unlikely to be a legitimate communication, generating, via the controller of the telecommunication network, a proof-of-identity (PoI) message for delivery to the originating device;
receiving, at the controller of the telecommunication network, a reply message that is responsive to the PoI message; and
establishing via the telecommunication network, the communication based at least in part on the reply message.

17. The one or more non-transitory computer-readable media of claim 16, wherein acts further comprise:
in response to determining that the communication is likely to be a legitimate communication, establishing the communication between the originating device and the recipient device.

18. The one or more non-transitory computer-readable media of claim 16, wherein the acts further comprise:
detecting a completion of the communication;
analyzing metadata associated with the communication to infer a likelihood of legitimacy of the communication;
in response to the likelihood of legitimacy being less than a predetermined legitimacy threshold, generating a feedback request for delivery to the recipient device;
receiving feedback data that is responsive to the feedback request; and
updating the communication verification model based at least in part on the feedback data.

19. The one or more non-transitory computer-readable media of claim 16, wherein the communication corresponds to a voice communication, and
wherein, the PoI message corresponds to an SMS message.

20. The one or more non-transitory computer-readable media of claim 16, wherein the communication corresponds to an SMS communication, and wherein, the PoI message corresponds to one of a voice communication or a subsequent SMS message.

\* \* \* \* \*